(12) United States Patent
Van Ceulen et al.

(10) Patent No.: US 9,929,482 B2
(45) Date of Patent: Mar. 27, 2018

(54) SYSTEM FOR ATTACHING ELECTRICAL EQUIPMENT TO A METALLIC SUPPORT

(71) Applicant: SNECMA, Paris (FR)

(72) Inventors: Sylvain Van Ceulen, Paris (FR); Francois Jean Comin, Melun (FR); Pierre-Guillaume Bardin, Dammarie-les-Lys (FR)

(73) Assignee: SNECMA, Paris (FR)

( * ) Notice: Subject to any disclaimer, the term of this patent is extended or adjusted under 35 U.S.C. 154(b) by 120 days.

(21) Appl. No.: 14/439,891

(22) PCT Filed: Oct. 23, 2013

(86) PCT No.: PCT/FR2013/052542
§ 371 (c)(1),
(2) Date: Apr. 30, 2015

(87) PCT Pub. No.: WO2014/068224
PCT Pub. Date: May 8, 2014

(65) Prior Publication Data
US 2015/0263440 A1    Sep. 17, 2015

(30) Foreign Application Priority Data
Oct. 30, 2012 (FR) ..................... 12 60372

(51) Int. Cl.
*F16B 5/02* (2006.01)
*G01P 3/42* (2006.01)
(Continued)

(52) U.S. Cl.
CPC ............. *H01R 9/16* (2013.01); *F16B 5/0241* (2013.01); *G01P 1/026* (2013.01); *F16B 2001/0064* (2013.01); *Y10T 403/75* (2015.01)

(58) Field of Classification Search
None
See application file for complete search history.

(56) References Cited

U.S. PATENT DOCUMENTS 4,834,569 A * 5/1989 Foote .................... F16B 5/0241
                                                    403/179
5,996,408 A * 12/1999 TenBrink ................ G01P 1/026
                                                    310/168

(Continued)

FOREIGN PATENT DOCUMENTS

EP    1 273 766    1/2003
GB    2 227 764    8/1990

OTHER PUBLICATIONS

International Search Report dated Jan. 31, 2014 in PCT/FR2013/052542 Filed Oct. 23, 2013.

(Continued)

*Primary Examiner* — Joshua J Michener
*Assistant Examiner* — Kyle J. Walraed-Sullivan
(74) *Attorney, Agent, or Firm* — Oblon, McClelland, Maier & Neustadt, L.L.P.

(57) ABSTRACT

A system for attaching electrical equipment to a metallic support and including a pin designed to be inserted through a through-housing of the metallic support and a metallic insert of the electrical equipment, and a device for insulating the metallic support, extending between the metallic support and the metallic insert. The system also includes a mechanical retention device designed to apply load to the insulating device so as to keep them in contact with the metallic support and with the metallic insert.

7 Claims, 5 Drawing Sheets

(51) Int. Cl.
*H01R 9/16* (2006.01)
*G01P 1/02* (2006.01)
*F16B 1/00* (2006.01)

(56) References Cited

U.S. PATENT DOCUMENTS

| | | | | |
|---|---|---|---|---|
| 6,354,815 | B1* | 3/2002 | Svihla | F01D 25/145 |
| | | | | 417/407 |
| 6,446,005 | B1* | 9/2002 | Bingeman | A63B 24/0021 |
| | | | | 180/167 |
| 2002/0098063 | A1* | 7/2002 | Pinzl | F16B 37/042 |
| | | | | 411/544 |
| 2003/0019308 | A1* | 1/2003 | Oppermann | G01D 11/245 |
| | | | | 73/866.5 |
| 2003/0077118 | A1* | 4/2003 | Kobusch | F16B 5/0283 |
| | | | | 403/408.1 |
| 2004/0156676 | A1* | 8/2004 | Boudreaux | F16B 5/02 |
| | | | | 403/408.1 |
| 2005/0025566 | A1* | 2/2005 | Hasegawa | F16B 5/0233 |
| | | | | 403/408.1 |
| 2005/0201846 | A1* | 9/2005 | Santamaria | B62D 25/163 |
| | | | | 411/108 |
| 2008/0191571 | A1* | 8/2008 | Fukuda | F16F 1/3732 |
| | | | | 310/91 |
| 2008/0226418 | A1* | 9/2008 | Parisi | B60R 11/00 |
| | | | | 411/337 |
| 2010/0202856 | A1* | 8/2010 | Donovan | F16B 5/0208 |
| | | | | 411/546 |
| 2011/0311333 | A1* | 12/2011 | Schaser | F16B 5/0241 |
| | | | | 411/378 |
| 2013/0071203 | A1* | 3/2013 | Hay | F16B 5/0241 |
| | | | | 411/111 |
| 2013/0287520 | A1* | 10/2013 | Hartzler | F16B 5/0241 |
| | | | | 411/347 |
| 2013/0315658 | A1* | 11/2013 | Schwarzbich | F16B 5/00 |
| | | | | 403/229 |
| 2014/0115868 | A1* | 5/2014 | Ruhlander | F04B 39/0044 |
| | | | | 29/525.02 |

OTHER PUBLICATIONS

French Preliminary Search Report dated Jun. 24, 2013 in Patent Application No. FR 1260372 (with English translation of categories of cited documents).

* cited by examiner

SYSTEM FOR ATTACHING ELECTRICAL EQUIPMENT TO A METALLIC SUPPORT

BACKGROUND OF THE INVENTION

Field of the Invention

The invention generally relates to a system for attaching electrical equipment to a metallic support.

The invention can especially relate to a system for attaching electrical equipment, for example an inductive sensor adapted to measure the rotation speed of an engine, called sensor N1, on a metallic support, for example a metallic housing of the engine.

Discussion of the Background

Inductive sensors of type N1 are sensors adapted to detect the rotation speed of a phonic wheel of an engine by detection of the passage of teeth in front of the sensor, generating a variation in the magnetic field which creates alternative current in the sensor. The sensor N1 measures and monitors the rotation speed of an engine, and sends this information to a calculator of a control system by means of metallic lugs connected to said sensor N1.

For this, the sensor N1 usually comprises at least one metallic insert interface, generally one for each pole, each connected to a lug by means of metallic pieces adapted to enable transmission of the signal to the control calculator.

Reference could be made in particular to the sensor 1 of type N1 marketed by the company MEGGITT under reference "N1 Speed Probe" for more information on this insert.

The sensor N1 is generally mounted on a structural piece of the housing opposite the phonic wheel. For this, a metallic screw is inserted into each of the inserts so as to fix the sensor on the housing and ensure electrical transmission to the lugs.

However, since the housing is a metallic support, the sensor N1 must be mounted on the support by being electrically insulated from the latter to be able to transmit the electric signal to the calculator.

An example of such assembly is illustrated in FIG. 1a. As is evident, the usual system for attaching comprises a screw 3', sleeves with metallic collar 40' and insulating 30', an electrically insulating spacer 32', a metallic washer 50', a lug 60' and a nut 6'.

The screw 3' is inserted into the insert 10' such that the screw head 4' stops against the insert 10'. Then, the metallic collared sleeve 40' and the electrically insulating collared sleeve 30' are fitted successively onto the screw such that the collars of the sleeves are stopped against the insert.

The metallic support 20' is positioned against the insulating sleeve 30', then the spacer 32' which is electrically insulating and mechanically suppler than the other pieces, of overall cylindrical shape, and the metallic washers 50' are fitted successively in above the metallic support 20'. Finally, the lug 60' is arranged against the washer 50' and a nut 6' is screwed onto the end of the screw 3' to ensure mechanical retention of all the pieces.

The cylindrical part of the metallic sleeve 40' is sufficiently long to take up both the insulating sleeve 30', the metallic support 20', the insulating spacer 32' and the metallic washer 50' along its cylindrical part in contact with the screw 3', to enable transmission of the electric signal of the insert 10' to the lug 60'. Also, during tightening of the nut 6', the insulating collared sleeve 32' is compressed by the metallic washer 50' such that electrical contact is made between the insert 10', the metallic collared sleeve 40', the metallic washer 50' and the lug 60'.

In this assembly, transfer of the electric signal from the insert 10' to the lug 60' therefore occurs by way of the metallic sleeve 40' and the metallic washer 50'. Also, its electrical insulation is based on the use of the insulating sleeve 30' and the supple insulating spacer 32'.

Yet, this assembly is not adapted to be used in an engine, which when operating can undergo temperatures ranging from −55° C. to +160° C. and powerful vibrations from operation of the engine: these stresses in fact deform the spacer 32' and the insulating sleeve 30', causing the appearance of considerable play in the assembly, such that the sensor N1 is no longer held in position relative to the metallic support 20'. Also, polymers usually used for the sleeve 30' and the insulation spacer 32', for example polytetrafluoroethylene (PTFE) or polyetheretherketone (PEEK), have a vitreous transition temperature incompatible with the operating temperature of the sensor N1.

Document GB 2 227 764 per se proposes a system for attaching a metallic building attachment onto a metallic support for the purpose of limiting problems of bimetallic corrosion. The attachment is fixed to the support by means of a pin, inserted in through a recess formed in the attachment and in the support. A spacer, formed from insulating material, is also fitted on the pin and interposed between the attachment and the support. The system for attaching further comprises a joint, positioned against the spacer.

This system for attaching is also not adapted to be utilised in an engine, to the extent where the effect of the substantial stresses (vibratory environment and severe thermal) undergone by the spacer and the joint would be the appearance of considerable clearance between the support and the attachment. It appears in fact that despite the use of excellent insulating materials, the nut loosens and the insulating pieces deform in such conditions. But it is evident that the aim of this document is not to propose a system for attaching capable of undergoing such a severe environment, to the extent where normal conditions of use of the attachment are those of the building, specifically ambient temperature and negligible vibrations.

SUMMARY OF THE INVENTION

An aim of the invention is therefore to propose a system for attaching electrical equipment capable of both ensuring mechanical retention of the electrical equipment on a metallic support, transmitting an electric signal coming from the electrical equipment and electrically insulating the electrical equipment from the metallic support, and this despite a severe environment in terms of vibrations and temperatures of the equipment during operation.

For this, the invention proposes a system for attaching electrical equipment onto a metallic support, comprising:
  a pin adapted to be inserted via a through housing of the metallic support and a metallic insert of the electrical equipment, adapted to transmit an electric signal, and
  insulation means of the metallic support, extending between the metallic support and the metallic insert, and
characterized in that it further comprises mechanical retention means adapted to apply force to the insulation means to keep them in contact with the metallic support and the metallic insert.

In the case especially of a control system of an engine, such a system for attaching separates the electrical insulation functions, mechanical retention and tightening of nuts, by maintaining the insulation means in contact against the metallic support irrespective of the temperature and vibrations applied to the assembly. This eliminates any deformations of the insulation means due to thermal variations or vibrations undergone by the sensor and/or the metallic support. The electrical insulation from the metallic support and the mechanical retention of the sensor on the metallic support are therefore guaranteed in normal conditions of use of the sensor, that is, in ranges of vibrations and temperatures (up to 160° C.) which can be encountered in an engine, and enabling transmission of an electric signal.

Some preferred but non-limiting aspects of the system for attaching are the following:
the mechanical retention means comprise:
   a support element extending transversally to the pin, and
   elastic means, arranged between the support element of the piece (40) and the insulation means, adapted to exert the force on the insulation means,
the elastic means are at least one of the elements of the following group: a compression spring, a spacer,
the support element is a collar of a collared sleeve arranged between the pin and the through housing of the metallic support,
the support element is a collar formed integrally in a single piece with the pin,
the system for attaching further comprises a wedge, extending between the support element and the metallic insert along the pin, and adapted to retain the support element and the metallic insert at a minimal distance corresponding to the length of said wedge,
the insulation means comprise:
   a first insulating washer fitted on the pin between the metallic support and the metallic insert, and
   a second insulating washer fitted on the pin between the metallic support and the support element, and adapted to receive the force exerted by the elastic means,
the wedge extends between the pin and the insulation means, so as to prevent transmission to said insulation means of forces applied by the metallic insert on the support element or inversely,
the insulation means further comprise an insulating tube fitted on the pin and separating the metallic support from the support element,
the first and the second insulating washer and/or the insulating tube are made of polyetherimide,
the system for attaching further comprises a metallic washer, fitted on the pin and arranged between the first insulating washer and the insert, and
the system for attaching further comprises a lug fitted on the pin, in direct contact with the interface insert of the side opposite the insulation means. This reduces the number of surfaces in contact for transmission of the electric signal from the metallic insert to the control calculator.

BRIEF DESCRIPTION OF THE DRAWINGS

Other characteristics, aims and advantages will emerge more clearly from the following detailed description in reference to the appended figures given in a non-limiting example and in which.

DETAILED DESCRIPTION OF THE PREFERRED EMBODIMENTS

Figure 1A:
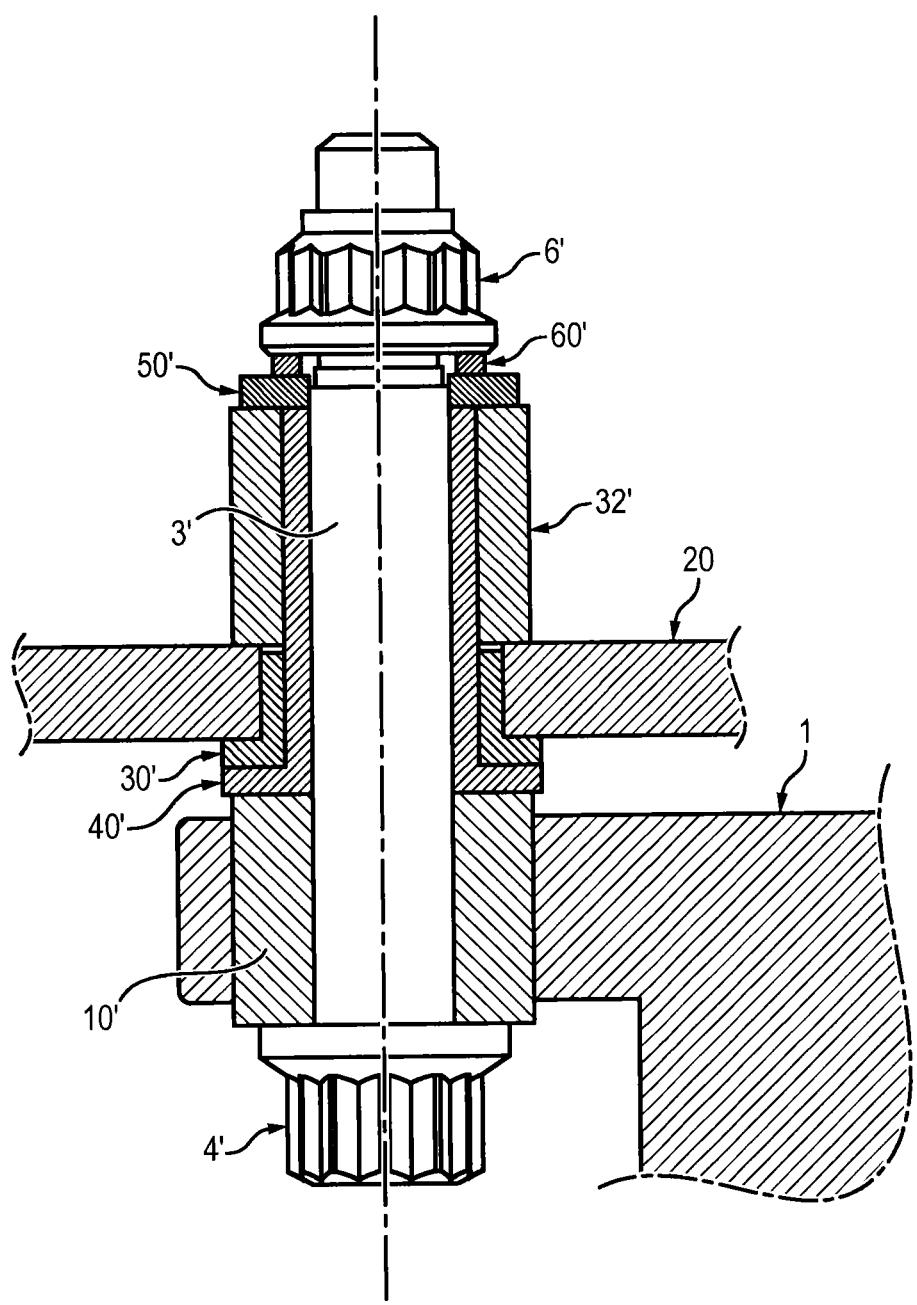
FIG. 1a illustrates an example of attachment of electrical equipment of sensor N1 type onto a metallic support according to the prior art.

In the following, the invention will be illustrated more particularly within the scope of a control system S of an engine, for example an aircraft engine M, comprising an inductive sensor 1 of the type of the sensor N1 fixed on a housing 20 of the engine, in which an electric signal is transmitted from the inductive sensor 1 to a calculator 2 of the control system S. But this is not limiting, to the extent where the attaching system of the invention can be applied to any type of electrical equipment, comprising a system for transmission of an electric signal (sensor, actuator, generator, etc.) which must be insulated electrically from the metallic frame (support) to which it is fixed and be capable of transmitting the electric signal to other electrical equipment, for example a system for processing this signal.

Also, normal conditions of use mean especially the temperatures and forces which can be applied to this electrical equipment. In the example illustrated, these are temperatures and vibrations which can be applied to the sensor during its use in a control system S of an engine M, temperatures which can range from −55° C. to around +160° C.

In reference to FIG. 2, this shows a sensor 1 fixed to a piece of metallic structure 20 of a housing of the engine M via an interface insert 10 by means of a system for attaching 5, which also enables its insulation electrical of the metallic support 20. The system for attaching 5 comprises for this insulation means 30, 32, 34 and mechanical retention means 40, 42 which compress the insulation means 30, 32 against the metallic support 20 to keep it in contact with the metallic support 20 at any instant under normal conditions of use of the sensor 1.

Figure 1B:
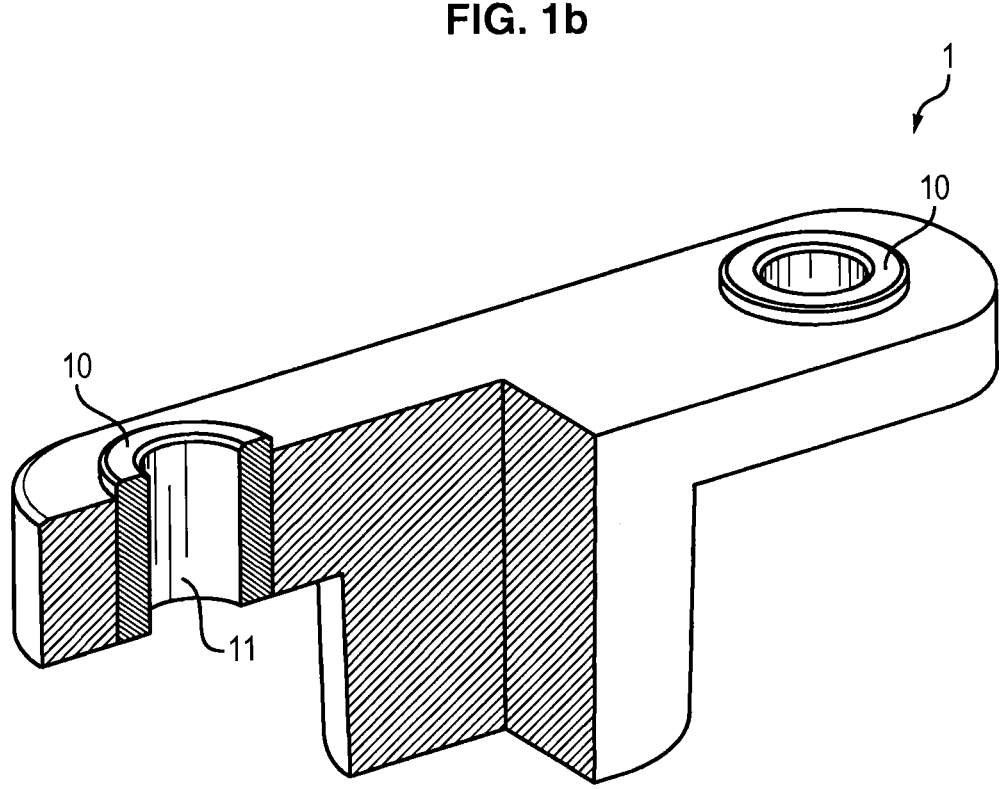
FIG. 1b is a three-dimensional view in partial section of an example of electrical equipment which can be fixed by means of a system for attaching according to the invention.

The sensor 1 can comprise two identical metallic interface inserts 10, as illustrated in FIG. 1b, so as to form a dipole to allow passage of electric current. Each insert 10 can be fixed to the metallic support 20 by means of a system for attaching 5 according to the invention, which also makes assembly more robust.

Each insert 10 comprises especially a recess 11 adapted to receive an attachment axis 3 of the attaching system 5. For example, the recess 11 can be of overall cylindrical shape. Here, the function of the insert 10 is to send an electric signal generated by the sensor 1 to the calculator 2 of the control system S by means of lugs 60 and ensure attachment and mechanical retention of the sensor 1. For this, it is made as is known from metallic material, stainless steel for example.

The metallic support 20 comprises a through housing 21 for also receiving the attachment axis 3. Also, the internal dimensions of the recess 21 of the metallic support 20 are larger than the external diameter of the pin 3 to enable insertion of intercalary pieces between the metallic support 20 and the pin 3.

In particular, the metallic support 20 is separated from the metallic insert 10 by insulation means 30, 32, 34.

The insulation means of the system for attaching 5 can comprise two insulating washers 30, 32, arranged on either side of the metallic support 20, and an insulating tube 34 arranged between the pin 3 and the metallic support 20. The insulating washers 30, 32 and the insulating tube 34 are preferably fitted on the pin 3.

In this embodiment, the first insulating washer 30 can be arranged against a lower surface of the metallic support 20, opposite the metallic insert 10, while the second insulating washer 32 can be arranged against the surface opposite the metallic support 20, called the upper surface. The insulating washers 30, 32 are preferably made of material having good mechanical characteristics in operating conditions of the sensor 1 and ensure good electrical insulation for reduced cost. For example, the insulating washers 30, 32 can be made of polyetherimide (PEI).

The mechanical resistance of the insulating washers 30, 32 can be further improved by loading the PEI with fibreglass. For example, the insulating washers 30, 32 can be made of material of type ULTEM® 2400 or ULTEM® 2410, which comprise PEI loaded at 40% with fibreglass.

The insulating tube 34 per se can be of a shape complementary to that of the pin 3, and is adapted to electrically insulate the metallic support 20 from the pin 3. It can be made of any electrically insulating material capable of resisting temperature under the operating conditions of the sensor 1. For example, the insulating tube can be made of PTFE. Also, the insulating tube 34 is dimensioned so as to be in contact with the pin 3, to rest against the internal surface of the recess 21 of the metallic support 20, and to fully or partially pass through the washers 30, 32. Here, the insulating tube 34 projects for example beyond the recess 21, and partially penetrates the washers 30 and 32.

Also, as illustrated in the figures, the dimensions of the washers 30, 32 can be selected so as to leave clearance with the insulating tube 34 so as not to transmit mechanical stresses to the latter in conditions of use. For this, a length of the insulating tube 34 can for example be placed between the thickness of the metallic support and the thickness of the stack formed by the metallic support 20 and the two washers 30, 32, for an external diameter at most equal to the internal diameter of the washers 30, 32. The second insulating washer 32 can further comprise, at the level of its face opposite the insulating tube 34, an annular throat 33 to ensure that only few of the stresses which are applied to it are transmitted to the insulating tube 34.

The mechanical retention means of the system for attaching 5 can especially comprise a support element 41 mounted on the pin 3 extending transversally to the pin 3 and elastic means 42, arranged between the support element 41 and the second insulating washer 32, adapted to rest on the support element 41 so as to exert force on the insulation means (in particular the first insulating washer 32). If needed, the system for attaching 5 further comprises a shoulder 4, adapted to hold the support element 41 fixed in position relative to the pin 3. For this, the shoulder 4 extends transversally to the pin 3 to form a stop adapted to receive the support element 41.

According to a first embodiment (FIG. 2a), the pin 3 is a screw. The barrel of the screw 3 is inserted in the recess 21 of the metallic support 20 and in the metallic insert 10, and receives the insulation means 30, 32, 34 and the mechanical retention means 41, 42, while a lower surface of the head of the screw 3 forms the shoulder 4 of the system for attaching 5 against which the support element 41 abuts.

Figure 2A:
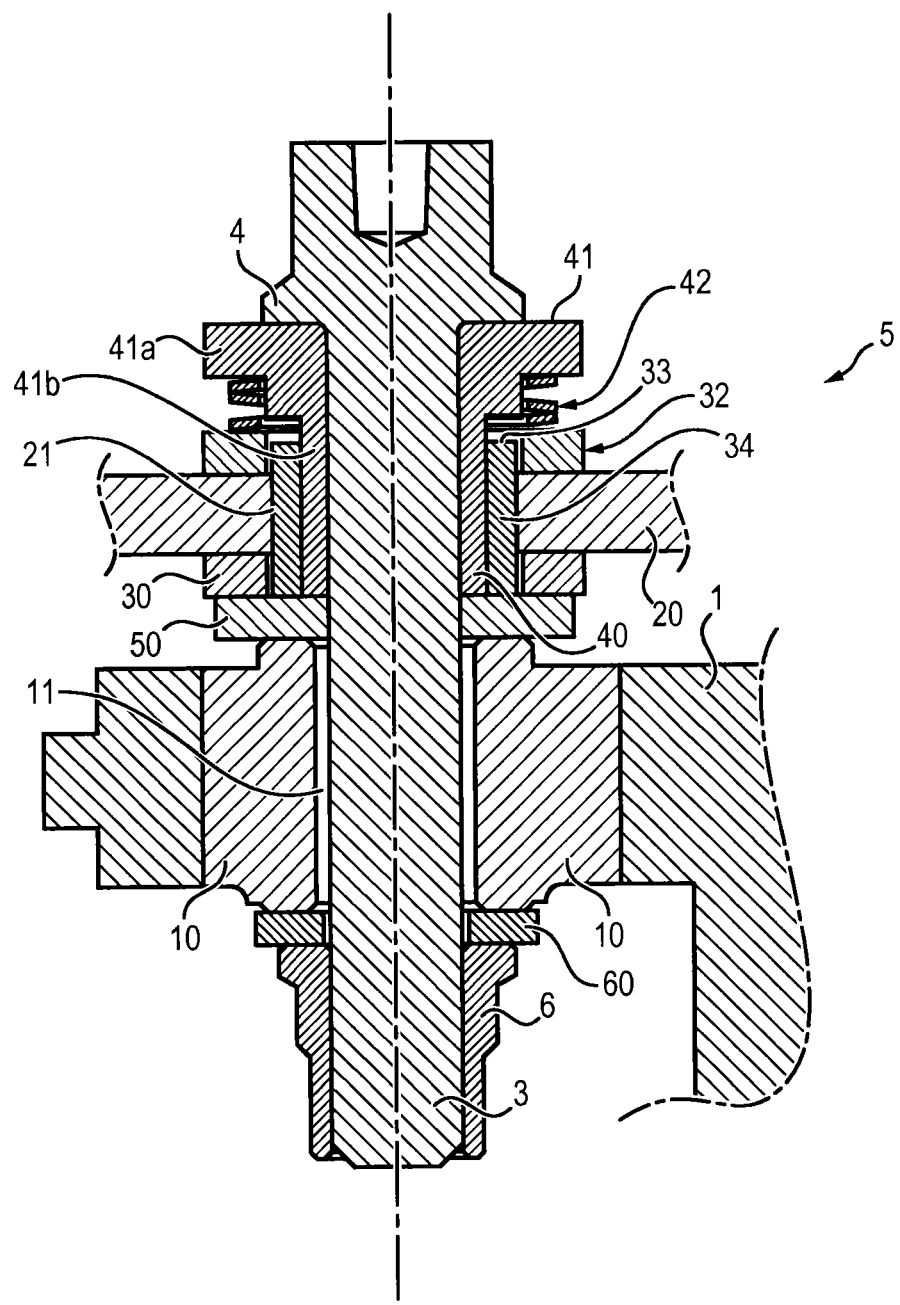
FIGS. 2a to 2c illustrate an example for attaching an inductive sensor onto a metallic support of a control system according to the invention.
Figure 2B:
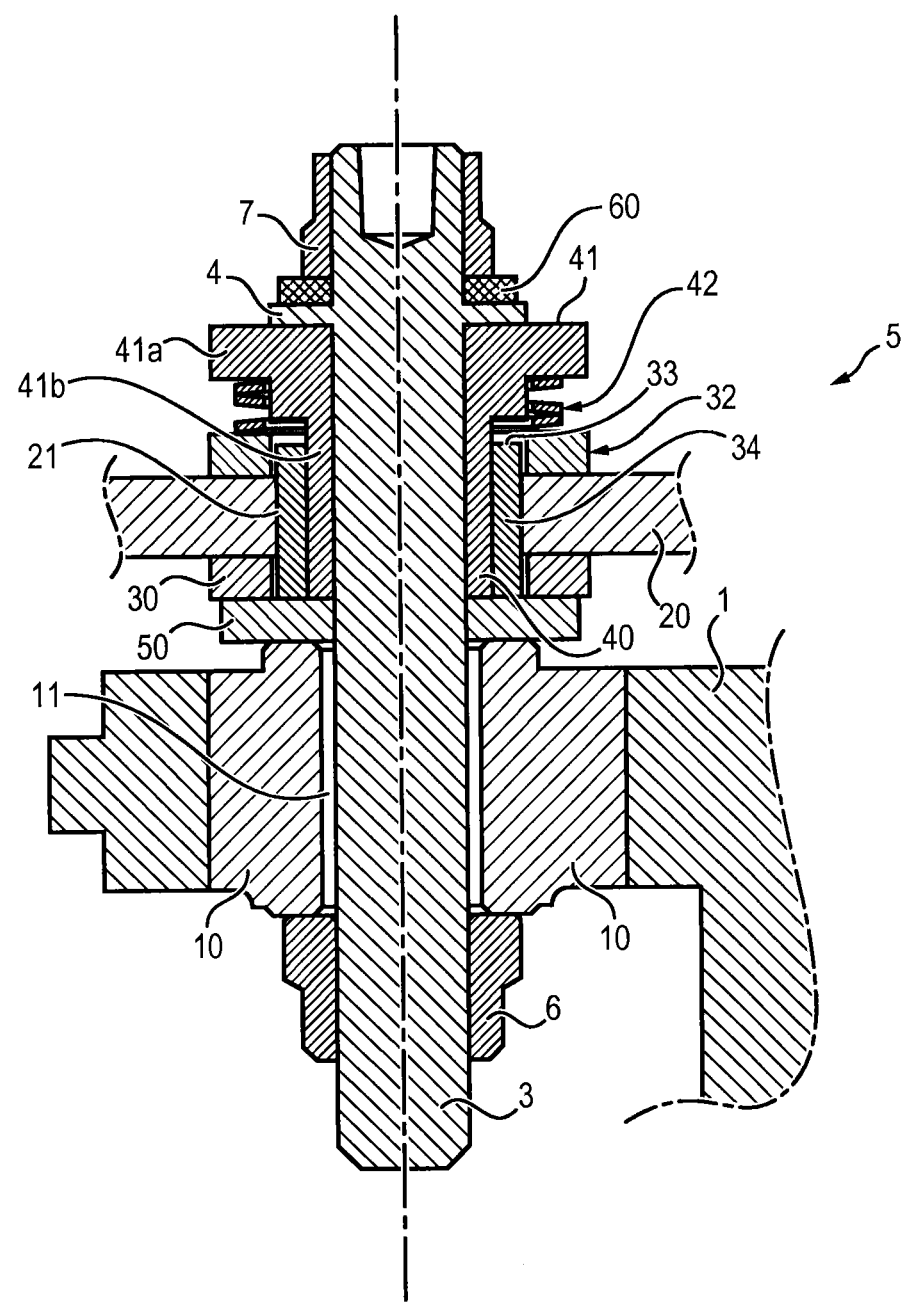

According to a second embodiment (FIG. 2b), the pin 3 is a threaded rod adapted to receive a nut 7. The shoulder 4 of the system for attaching 5 can be a transversal collar formed integrally in a single piece with the threaded rod 3 at the level of an end of the latter, and the support element 41 can especially be a collar 41a of a collared sleeve 40 (FIGS. 2a and 2b).

The collared sleeve 40 is fitted on the pin 3, such that its collar 41a abuts against the shoulder 4, and receives along its cylindrical part 41b the insulating washers 30, 32, the insulation tube 34 and the metallic support 20. In other words, the recess 21 of the metallic support 20 is separated on the one hand from the pin 3 by the sleeve 40 and the insulation tube 34, and on the other hand from the shoulder by the collar 41a and the second insulation washer 32.

Figure 2C:
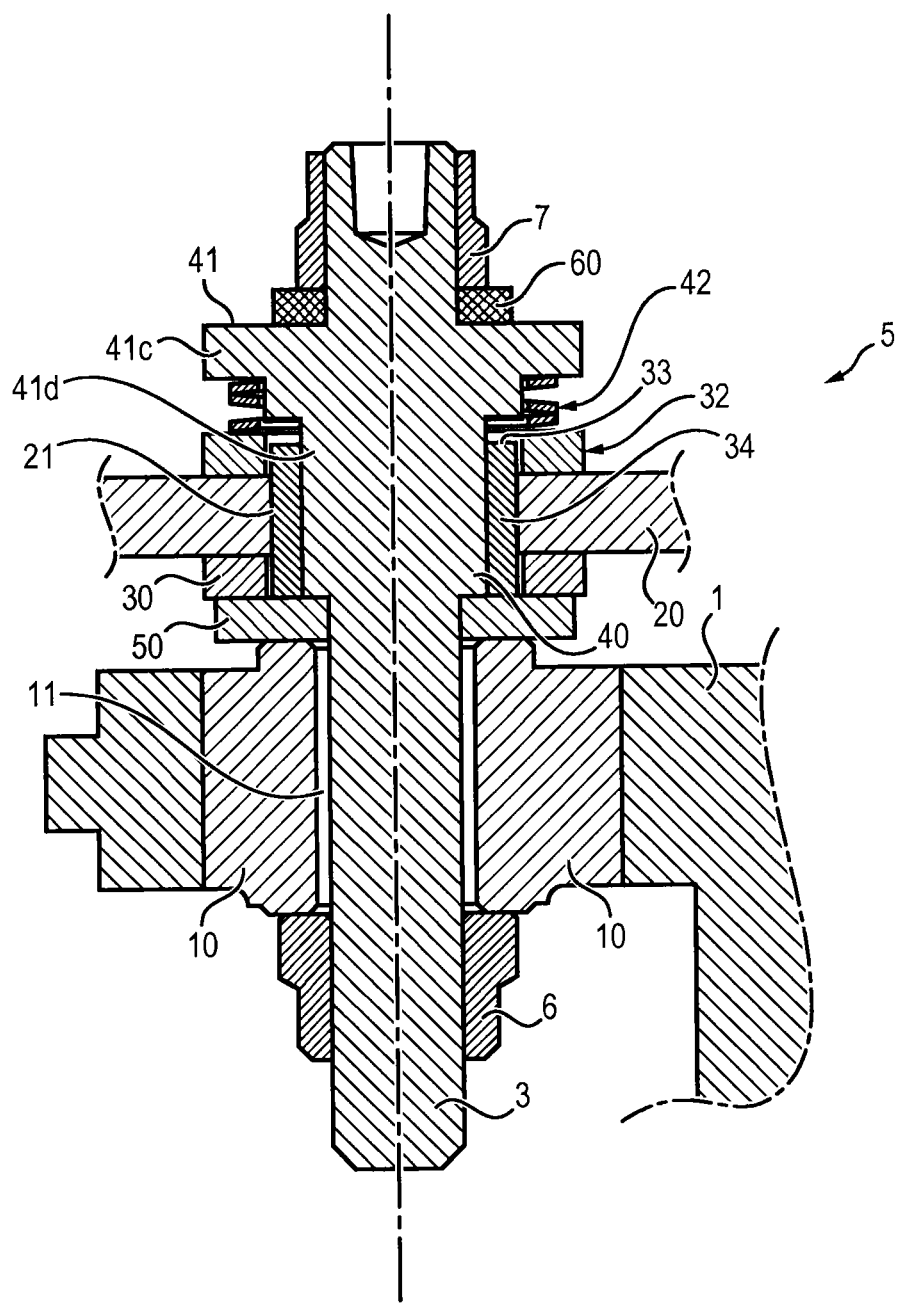

As a variant, the support element 41 can be a collar 41c formed integrally in a single piece with the pin 3 (FIG. 2c). The system for attaching 5 has no shoulder 4, the support element 41 being per se already fixed relative to the pin 3. To guarantee contact between the pin 3 and the insulating tube 34, as well as passage of the electric signal, the pin 3 can have a local excessive thickness 41d extending from the collar 41c over a length substantially equal to the thickness of the washer 302 and the insulating tube 34.

Alternatively (not illustrated in the figures), the pin 3 has no such excessive thickness and has a constant diameter as far as the collar 41c, a sleeve being fitted on the pin 3 so as to enable passage of the signal and the contact mechanical with the insulating tube 34.

In this embodiment, the pin 3 can for example be a threaded rod.

The elastic means 42 per se are fitted on the pin 3, between the support element 41 and the second insulating washer 32 so as to apply compression force to the first insulating washer 32. In the case of a collared sleeve 40, the elastic means 42 are therefore fitted on the barrel 41b of the sleeve 40, while in the case of the collar 41c formed integrally with the pin 3, the elastic means 42 are fitted directly on the pin 3.

It is understood that this compression stress is transmitted by means of the second insulating washer 32 to the subjacent pieces of the assembly, specifically especially to the metallic support 20, to the first insulating washer 30 as well as to the metallic insert 10, which ensures mechanical retention of the sensor 1 on the metallic support 20, despite the vibrations and variations in temperature undergone by the assembly. In fact, the elastic means applying a compression force to the second insulating washer 32, any deformation of the insulating means 30, 32, 34 due to variations of the conditions of the environment of the sensor is compensated by the elasticity of the elastic means 42.

The elastic means 42 can for example be formed by a compression spring, such as a helicoidal spring, Belleville washers, Smalley washers, etc. The stiffness of the spring 42 is dimensioned as a function of the distance separating the support element 41 from the washer 32 to resist normal vibration stresses applied by the metallic support 20 and control the crushing of the insulation means 30, 32, 34, independently of the tightening torque of the attaching system 5. The tightening torque of the nuts is not in fact transmitted to the spring 42 or to the insulation means 30, 32 34 due to the presence of either the cylindrical part 41b of the collared sleeve (FIGS. 2a, 2b), or of the excessive thickness 41d of the pin 3 (FIG. 2c), according to the variant embodiment, which play a role of wedge maintaining a minimal distance between the support element 41 and the metallic insert 10 corresponding to the length of said wedge. It is clear in fact that any tightening force applied to the system for attaching 5 is transmitted from the nut 6 to the metallic insert 10, then to the wedge 41b, 41d and finally to the support element 41a, 41c, without passing through the insulation means 30, 32, 34.

Consequently, the insulation means 30, 32, 34 are stressed only by the elastic means 42, and the force applied at any instant to the insulation means 30, 32, 34 can therefore be controlled precisely and independently by dimensioning the stiffness of the spring 42 and its crushing as a function of the distance between the support element 41 and the washer 32.

There are therefore two independent force paths: a first path of forces is applied by tightening of the attaching system 5 on the metallic support 20, and is achieved with standard torque by means of the nut 6; the second path of forces per se relates to crushing of the insulation means 30, 32, 34 and is achieved by means of the spring 42 only.

Therefore, with stiffness of the order of 25 N/mm, the elastic means 42 are capable of resisting ranges of acceleration (vibrations) reaching 160 G for an equipment mass of 40 g, irrespective of the tightening torque of the nuts on the pin 3.

According to an embodiment, the support element 41 further comprises a shoulder 43, extending to the vicinity of the insulating tube 34. The elastic means 42 is supported against the support element 41 only, such that neither the shoulder 43 nor the insulating tube 34 supports substantial stresses. The insulating tube 34 is therefore less likely to deform, despite its inherent material (plastic material) and the severe environment to which it is subjected.

Optionally, the resulting assembly can further comprise a metallic washer 50, arranged between the insulation means 30, 32, 34 and the metallic insert 10. In the embodiment described hereinabove, the metallic washer 50 forms a support both for the first insulating washer 30 and the metallic insert 10, and can play the role of regulating wedge to enable precise assembly of the pieces on the pin 3 and regulate the gap of the sensor 1 with the turbocompressor the rotation speed of which must be determined. If needed, the internal diameter of the metallic washer 50 ensures clearance during assembly of the metallic washer 50 on the pin 3 to improve control of the position of the sensor 1.

Finally, a lug 60 is fitted on the pin 3 so as to be connected electrically to the metallic insert 10 and to receive the electric signal transmitted by the sensor 1, and the whole is held in position by tightening of a nut 6 on the pin 3.

For this, the lug 60 can be made of electrically conductive material such as metal and arranged to stop against the support element 41, such that the electric signal transits from the metallic insert 10 to the lug 60 by means of the pin 3, and if required the metallic sleeve 41b and/or the metallic washer 50. The pin 3 is then closed by means of the nut 7 and/or the nut 6, which is tightened so as to ensure mechanical retention of the assembly and application of compression force by the elastic means 42.

As a variant, as illustrated in FIG. 2a, the lug 60 can be mounted in direct contact with the metallic insert 10, at the level of its lower face opposite the insulation means, especially by way of the specific arrangement of the insulation means 30, 32, 34 and the mechanical retention means 40, 42 relative to the insert 10. This assembly reduces the number of surfaces in contact for transmission of the electric signal to the lug 60, and therefore losses by Joule effect, but also any discontinuities in signal. The pin 3 must be turned down relative to the prior art to make for easy assembly of the lug 60 such that the shoulder 4 is near the support element 41. The nuts 6 and/or 7 are then screwed against the lug 60. The assembly formed by the metallic insert 10, the sensor 1, the insulation means, the metallic support 20, the mechanical retention means 41, 42 and if required the metallic washer 50 is in fact mounted prior to assembly of the lug 60, such that turning down the pin 3 makes the lower face of the insert 10 accessible for fitting the lug 60 and tightening the nut 6.

To enable sufficient mechanical retention without degrading the insulation means 30, 32, 34, the metallic washer 50 is selected so that it can support tightening standard of the nut 6 on the pin 3, which can be of the order of 3.5 N·m (for a pin 3 having a diameter of the order of 4.82 mm). So, the metallic washer 50 can especially be made of a metallic material of stainless steel type. If needed, when the assembly is made with a collared sleeve 40, the latter can also be made of metallic material of stainless steel type, in particular in its cylindrical zone 41b in contact with the pin 3.

The resulting ensemble prevents deterioration of the electrical insulation means during tightening with standard torque, the tightening forces being transmitted to the metallic pieces only (specifically the lug 60, the insert 10, the washer 50 and the collared sleeve 40), also allowing firm contact between the metallic insert 10 and the lug 60.

The invention claimed is:

1. A system for attaching electrical equipment on a metallic support, comprising:
    a pin adapted to be inserted through a through housing of the metallic support and a metallic insert of the electrical equipment, adapted to transmit an electric signal;
    insulation means for electrically insulating the electrical equipment from the metallic support, extending between the metallic support and the metallic insert, the insulation means being free of metal; and
    mechanical retention means adapted to apply force to the insulation means so as to keep the insulation means in contact against the metallic support and the metallic insert,
    wherein the insulation means includes:
        a first insulating washer fitted on the pin and abutting a first side of the metallic support,
        a second insulating washer fitted on the pin and abutting a second side of the metallic support, and
        an insulating pin inserted into the through housing of the metallic support, wherein the mechanical retention means includes:
        a support element including a collar extending transversally to the pin and a cylindrical portion, the insulating pin being fitted around the cylindrical portion of the support element, and
        elastic means, arranged between the collar of the support element and the first insulating washer to exert force onto the insulation means, and
    wherein the insulating means and the mechanical retention means are arranged closer to a first side of the electrical equipment than to a second side of the electrical equipment, and a nut is provided on the pin closer to the second side of the electrical equipment than to the first side of the electrical equipment.

2. The system for attaching according to claim 1, wherein the elastic means comprises at least of elements of the following group: a compression spring, a spacer.

3. The system for attaching according to claim 1, wherein the support element is a collar formed integrally in a single piece with the pin.

4. The system for attaching according to claim 1, wherein the first insulating washer is fitted on the pin between the metallic support and the metallic insert, and the second insulating washer is fitted on the pin between the metallic support and the support element, and adapted to receive the force exerted by the elastic means.

5. The system for attaching according to claim 1, wherein at least one of the first insulating washer, the second insulating washer, and the insulating tube is made of polyetherimide.

6. The system for attaching according to claim 4, further comprising a metallic washer, fitted on the pin and arranged between the first insulating washer and the metallic insert.

7. The system for attaching according to claim 1, further comprising a lug fitted on the pin, in direct contact with the metallic insert of the side opposite the insulation means.

* * * * *